United States Patent
Wada et al.

(10) Patent No.: US 10,884,679 B2
(45) Date of Patent: Jan. 5, 2021

(54) DISPLAY GENERATION APPARATUS FOR EASILY DISTINGUISHING PROGRESS INFORMATION AND COMPUTER READABLE MEDIUM FOR THE SAME

(71) Applicant: FUJI XEROX CO., LTD., Tokyo (JP)

(72) Inventors: Masanori Wada, Yokohama (JP); Naohiro Sawata, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 16/528,747

(22) Filed: Aug. 1, 2019

(65) Prior Publication Data
US 2020/0257475 A1  Aug. 13, 2020

(30) Foreign Application Priority Data

Feb. 8, 2019 (JP) .................................. 2019-021995

(51) Int. Cl.
*G06F 3/12* (2006.01)

(52) U.S. Cl.
CPC ............ *G06F 3/1207* (2013.01); *G06F 3/126* (2013.01)

(58) Field of Classification Search
None
See application file for complete search history.

(56) References Cited

U.S. PATENT DOCUMENTS

| 10,423,367 | B1* | 9/2019 | Yamamoto | G06F 3/1256 |
| 2007/0229879 | A1* | 10/2007 | Harmon | G06F 3/1207 |
| | | | | 358/1.15 |
| 2007/0229895 | A1* | 10/2007 | Fujimori | G06F 3/1208 |
| | | | | 358/1.16 |
| 2007/0229896 | A1* | 10/2007 | Fujimori | G06F 3/1288 |
| | | | | 358/1.16 |
| 2008/0123130 | A1* | 5/2008 | Matsumoto | G06F 3/1285 |
| | | | | 358/1.15 |
| 2014/0118775 | A1* | 5/2014 | Motamed | G06Q 10/063 |
| | | | | 358/1.15 |

FOREIGN PATENT DOCUMENTS

JP  2013-196286  9/2013

OTHER PUBLICATIONS

English language abstract and machine translation of JP2013-196286.

* cited by examiner

*Primary Examiner* — Henok Shiferaw
(74) *Attorney, Agent, or Firm* — Fildes & Outland, P.C.

(57) ABSTRACT

A display generation apparatus includes: a receiving unit that receives instruction information including information for providing an instruction to perform first processing that is performed by a first processing entity which notifies the display generation apparatus of progress in processing over a communication line, and information for providing an instruction to perform second processing that is performed by a second processing entity which does not notify the display generation apparatus of the progress in the processing over the communication line; and a generation unit that generates first progress information indicating progress of the first processing and second progress information indicating progress of the second processing based on the instruction information, in such a manner that the second progress information is displayed on a same screen on which the first progress information is displayed.

20 Claims, 13 Drawing Sheets

FIG. 6

| ORDER ACCEPTANCE ID | DATE AND TIME FOR ORDER ACCEPTANCE | ORDER ACCEPTANCE STATUS | ESTIMATED DATE AND TIME FOR SHIPPING | ... |
|---|---|---|---|---|
| 10000 | 2018/1/9 0:00 | WAITING FOR JOB | 2018/11/30 0:00 | |
| ... | ... | ... | ... | |

FIG. 7

| PRODUCT ID | PRODUCT NAME | NUMBER OF COPIES | PRODUCT STATUS | ESTIMATED DATE AND TIME WHEN POST-PROCESSING WILL START | ... |
|---|---|---|---|---|---|
| 10000-1 | XY CLUB | 1 | WAITING FOR JOB | | |
| ... | ... | ... | ... | ... | |

FIG. 8

| COMPONENT ID | COMPONENT NAME | NUMBER OF PAGES | NUMBER OF COPIES | COMPONENT STATUS | ESTIMATED DATE AND TIME WHEN PRINTING WILL START | PRINTING MACHINE NAME | SUPPLY CATEGORY | ESTIMATED DATE AND TIME FOR RECEPTION | ... |
|---|---|---|---|---|---|---|---|---|---|
| 10000-1-1 | BOOK COVER | 2 | 1 | WAITING FOR PRINTING | | B-5 | MANUFACTURE | | |
| 10000-1-3 | MAIN BODY | 230 | 1 | WAITING FOR PRINTING | | A-1 | MANUFACTURE | | |
| 10000-1-10 | COVER | 1 | 1 | WAITING FOR PRINTING | | PRINTING IN ANY OTHER DEPARTMENT | SUPPLY | 2018/11/27 0:00 | |
| ... | ... | ... | ... | ... | ... | ... | ... | ... | |

FIG. 10

ORDER ACCEPTANCE (ALL): 20 CASE

[DETAIL] [HOLDING] [HOLDING RELEASE] [SCHEDULING] [SPREAD OUT ALL] [CLOSE ALL]

| ORDER ACCEPTANCE ID | DATE AND TIME FOR ORDER ACCEPTANCE | ORDER ACCEPTANCE STATUS | ESTIMATED DATE AND TIME FOR SHIPPING |
|---|---|---|---|
| 10000 | 2018/1/9 0:00 | HOLDING | 2018/11/30 0:00 |

| PRODUCT BRANCH NUMBER | PRODUCT NAME | NUMBER OF COPIES | PRODUCT STATUS | ESTIMATED DATE AND TIME WHEN POST-PROCESSING WILL START |
|---|---|---|---|---|
| 1 | XY CLUB | 1 | HOLDING | |

| COMPONENT BRANCH NUMBER | COMPONENT NAME | NUMBER OF PAGES | NUMBER OF COPIES | COMPONENT STATUS | ESTIMATED DATE AND TIME WHEN PRINTING WILL START | PRINTING MACHINE NAME | SUPPLY CATEGORY | ESTIMATED DATE AND TIME FOR RECEPTION |
|---|---|---|---|---|---|---|---|---|
| 1 | BOOK COVER | 2 | 1 | WAITING FOR PRINTING | | B-5 | MANUFACTURE | |
| 3 | MAIN BODY | 290 | 1 | WAITING FOR PRINTING | | A-1 | MANUFACTURE | |
| 10 | COVER | 290 | 1 | WAITING FOR PRINTING | | PRINTING IN ANY OTHER DEPARTMENT | SUPPLY | 2018/11/27 00:00 |

FIG. 12

| COMPONENT ID | COMPONENT NAME | NUMBER OF PAGES | NUMBER OF COPIES | COMPONENT STATUS | ESTIMATED DATE AND TIME WHEN PRINTING WILL START | PRINTING MACHINE NAME | SUPPLY CATEGORY | ESTIMATED DATE AND TIME FOR RECEPTION | ... |
|---|---|---|---|---|---|---|---|---|---|
| 10000-1-1 | BOOK COVER | 2 | 1 | PRINTING IN PROGRESS | | B-5 | MANUFACTURE | | |
| 10000-1-3 | MAIN BODY | 230 | 1 | PRINTING IN PROGRESS | | A-1 | MANUFACTURE | | |
| 10000-1-10 | COVER | 1 | 1 | PRINTING IN PROGRESS | | PRINTING IN ANY OTHER DEPARTMENT | SUPPLY | 2018/11/27 0:00 | |
| ... | ... | ... | ... | ... | ... | ... | ... | ... | |

FIG. 14

| COMPONENT ID | COMPONENT NAME | NUMBER OF PAGES | NUMBER OF COPIES | COMPONENT STATUS | ESTIMATED DATE AND TIME WHEN PRINTING WILL START | PRINTING MACHINE NAME | SUPPLY CATEGORY | ESTIMATED DATE AND TIME FOR RECEPTION | ... |
|---|---|---|---|---|---|---|---|---|---|
| 1000-1-1 | BOOK COVER | 2 | 1 | PRINTING COMPLETED | | B-5 | MANUFACTURE | | |
| 1000-1-3 | MAIN BODY | 280 | 1 | PRINTING COMPLETED | | A-1 | MANUFACTURE | | |
| 1000-1-10 | COVER | 1 | 1 | PRINTING COMPLETED | | PRINTING IN ANY OTHER DEPARTMENT | SUPPLY | 2018/11/27 0:00 | |
| ... | ... | ... | ... | ... | ... | ... | ... | ... | |

DISPLAY GENERATION APPARATUS FOR EASILY DISTINGUISHING PROGRESS INFORMATION AND COMPUTER READABLE MEDIUM FOR THE SAME

CROSS REFERENCE TO RELATED APPLICATIONS

This application is based on and claims priority under 35 USC 119 from Japanese Patent Application No. 2019-021995 filed on Feb. 8, 2019.

BACKGROUND

Technical Field

The present invention relates to a display generation apparatus and a computer readable medium.

Related Art

As an information processing system that, over a network, not only receives an order for creation of a printed matter from a user, but also places an order with a partner for a job of delivering the printed matter, a system that has a storage unit in which a table including progress information indicating a situation of progress in a process job is stored for every process for a job, a progress situation management unit that manages a situation of progress in a job for the partner that places an order for the job, based on the table, and a screen generation unit that generates a progress situation management screen on which the situation of the progress in the job for the partner, based on the situation of the progress is known (for example, JP-A-2013-196286).

SUMMARY

In a case where progress information on processing that is performed by a processing entity which notifies a related apparatus of progress in processing over a communication line, and progress information on processing that is performed by the processing entity which does not notify the related apparatus of the progress in the processing over the communication line are displayed, for the latter progress information, the progress has to be known using a means other than the communication line. For that reason, it is considered that a configuration is employed which the latter progress information is displayed on a screen separate from a screen on which the former progress information is displayed, but although such a configuration is employed, when a user does not cause the screen to transition, it cannot be checked whether the progress information is the former progress information or the latter progress information.

Furthermore, in a case where progress information on processing that is performed by a processing entity which makes a connection using connection information that is retained in a related apparatus, and progress information on processing that is performed by the processing entity which cannot make a connection using the connection information that is retained in the related apparatus, for the latter progress information, the progress has to be known using information other than the connection information that is retained in the related apparatus. For that reason, it is considered that a configuration is employed in which the tatter progress information is displayed on a screen separate from a screen on which the former progress information is displayed, but although such a configuration is employed, when the user does not cause the screen to transition, the former progress information and the latter progress information cannot be distinguished.

Aspect of non-limiting embodiments of the present disclosure relates to easily distinguish progress information on processing that is performed by a processing entity which notifies a related apparatus of progress in processing over a communication line and progress information on processing that is performed by the processing entity which does not notify the related apparatus of the progress in the processing over the communication line, when compared with a case where a configuration is employed in which the former progress information and the latter progress information are displayed on separate screens, respectively.

Another aspect of non-limiting embodiments of the present disclosure relates to easily distinguish progress information on processing that is performed by a processing entity which makes a connection using connection information that is retained in a related apparatus and progress information on processing that is performed by the processing entity which does not make a connection using the connection information that is retained in the related apparatus, when compared with a case where a configuration is employed in which the former progress information and the latter progress information are displayed on separate screens, respectively.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display generation apparatus including: a receiving unit that receives instruction information including information for providing an instruction to perform first processing that is performed by a first processing entity which notifies the display generation apparatus of progress in processing over a communication line, and information for providing an instruction to perform second processing that is performed by a second processing entity which does not notify the display generation apparatus of the progress in the processing over the communication line; and a generation unit that generates first progress information indicating progress of the first processing and second progress information indicating progress of the second processing based on the instruction information, in such a manner that the second progress information is displayed on a same screen on which the first progress information is displayed.

BRIEF DESCRIPTION OF DRAWINGS

Exemplary embodiment(s) of the present invention will be described in detail based on the following figures, wherein:

FIG. 6 is a diagram illustrating an example of order acceptance data that is written into an order database according to the exemplary embodiment of the present invention;

FIG. 7 is a diagram illustrating an example of product data that is written into the order database according to the exemplary embodiment of the present invention;

FIG. 8 is a diagram illustrating an example of component data that is written into the order database according to the exemplary embodiment of the present invention;

FIG. 10 is a diagram illustrating an example of the order management screen that is displayed according to the exemplary embodiment of the present invention.

FIG. 12 is a diagram illustrating an example of the component data that is written into the order database after the printing instruction button according to the exemplary embodiment of the present invention is pushed down;

FIG. 14 is a diagram illustrating an example of the component data that is written into the order database after the printing completion report according to the exemplary embodiment of the present invention is received, or after the printing completion report button is pushed down.

DETAILED DESCRIPTION

An exemplary embodiment of the present invention will be described in detail below with reference to the accompanying drawings.

Outline of the Exemplary Embodiment

According to the present exemplary embodiment, there is provided a display generation apparatus (a computer) that generates first progress information indicating progress in first processing and second progress information indicating progress in second processing in such a manner that the second progress information is displayed on the same screen as the first progress information.

At this point, the first processing is processing that may be performed by a processing entity which notifies the display generation apparatus (the computer) of progress in processing over a communication line, and the second processing may be processing a processing entity that does not notify the display generation apparatus (computer) the progress in processing over the communication line. Alternatively, the first processing may be processing that is performed by a processing entity that makes a connection using connection information which is retained by the display generation apparatus (the computer), and the second processing may be processing that is performed by a processing entity that cannot make a connection using the connection information which is retained by the display generation apparatus (the computer).

As an example, a case is described where an order acceptance management manages acceptance of an order for a product that includes multiple components, where a printing management apparatus manages manufacturing of the product using printing or the like according to the acceptance of the order, and where a printing apparatus creates a component using, printing or the like according to the acceptance of the order. At this point, "product" products a basis for acceptance of an order for a book, a magazine or the like, and "component" is an element, such as a book cover or a main body, that makes up the product.

The printing management apparatus is taken as an example of the display generation apparatus, and the printing apparatus is taken as an example of the processing entity.

Entire Configuration of Printing Management System

Figure 1:
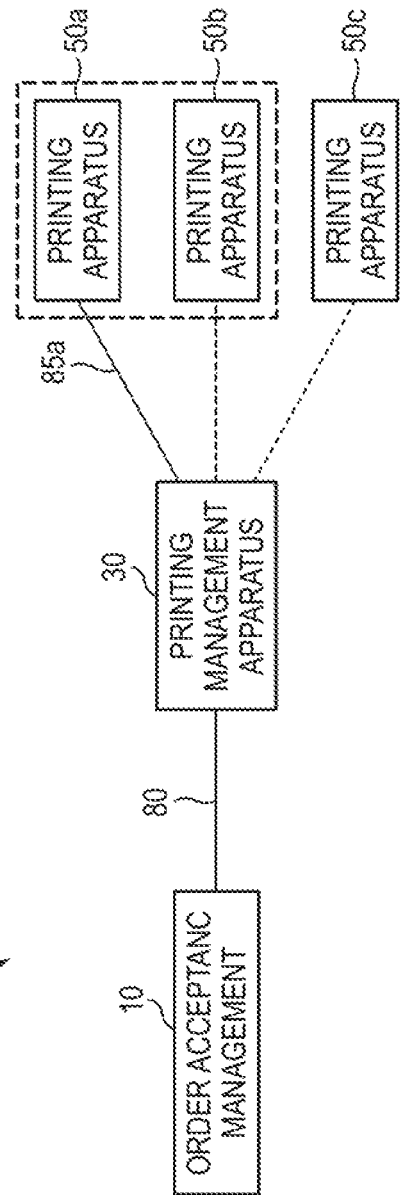
FIG. 1 is a diagram illustrating an example of an entire configuration of a printing management system according to an exemplary embodiment of the present invention.

FIG. 1 is a diagram illustrating an example of an entire configuration of a printing management system 1 according to the present exemplary embodiment. As described, the printing management system 1 is configured by connecting an order acceptance management apparatus 10 and a printing management apparatus 30 to each other through a communication line 80, and connecting the printing management apparatus 30 and, a printing apparatus 50a to each other through a communication line 85a. Furthermore, the printing management system 1 includes printing apparatuses 50b and 50c as well. However, the printing management apparatus 30, and the printing apparatuses 50b and 50c are not connected to each other through the communication line. Moreover, in FIG. 1, the printing apparatuses 50a to 50c are illustrated, but, in a case where these are not distinguished, in some cases, is referred to as a printing apparatus 50. Furthermore, only one order acceptance management apparatus 10 and only one printing management apparatus 30 are illustrated, but two or more order acceptance management apparatuses 10 and two or more printing management apparatuses 30 may be present.

The order acceptance management apparatus 10 is an apparatus, such as a computer, that is used by as a user in order to manage acceptance of an order for a product from a user. The order acceptance management apparatus 10 retains written instruction data for instructing the printing management apparatus 30 to perform management such as printing in accordance with the order acceptance. The written instruction data contains a description relating to the order acceptance (hereinafter referred to as "order acceptance description"), a description for managing the product (hereinafter referred to as "product description"), and a description relating to the component (hereinafter referred to as "component description"). At this point, the written instruction data, for example, is expressed using Extensible Markup Language (XML). In such a case, the order acceptance description is contained in the first hierarchical layer, the product description is contained in the second hierarchical layer, and the component is contained in the third hierarchical layer. Furthermore, in the component description, the order acceptance management apparatus 10 sets whether or not a component of the product is a component (hereinafter referred to as "manufacture component") that is printed in an organization (hereinafter referred to "organization") which owns the printing management apparatus 30, or is a component (hereinafter referred to as "supply component") that is printed and supplied in an organization (hereinafter referred to "any other organization") other than the organization which owns the printing management apparatus 30, according to a user operation. Moreover, the order acceptance management apparatus 10, for example, may be realized by a general-purpose personal computer.

The printing management apparatus 30 is an apparatus, such as a computer, that receives the written instruction data from the order acceptance management apparatus 10, and, based on the order acceptance description, the product description, and the component description that are included in the written instruction data, manages creating of a product, which includes printing of a component. On that occasion, the printing management apparatus 30 generates display information of an order management screen for managing an order. Moreover, the printing management apparatus 30, for example, may be realized by a general-purpose personal computer.

The printing apparatus 50 is an apparatus that performs printing of an image on a recording medium such as a paper sheet. In addition to this, the printing apparatus 50 may be an apparatus that reads the image from the recording medium such as a paper sheet and performs image transmission and image reception through a public communication line. The printing apparatus 50 is a printer from the perspective of performing only image printing, is a scanner from the perspective of performing only image reading, is a copy machine from the perspective of performing the image, reading and the image printing, and is a facsimile machine from the perspective of performing the image reading and image transmission, or the image reception and the image printing. An apparatus that performs the image printing, the image reading, the image transmission, and the image reception is hereinafter taken as an example of the printing apparatus 50, but in some cases, this is referred to as "printer". Moreover, the printing apparatus 50 may be one that uses a continuously fed paper sheet or a cut paper sheet as the recording medium.

At this point, three types of printing apparatuses, the printing apparatuses 50a to 50c, are assumed as the printing apparatuses 50.

The printing apparatus 50a is a printing apparatus that is managed by the organization and is connected to the printing management apparatus 30 through the communication line 85a. Therefore, the printing apparatus 50a notifies the printing management apparatus 30 of the progress in processing over the communication line 55a and is connected with an IP address or the like that is retained in the printing management apparatus 30.

The printing apparatus 50c is a printing apparatus that is managed by any other organization. From the printing management apparatus 30, it is not understood which printing apparatus the printing apparatus 50c is. The printing apparatus 50c may be the offset printing machine or may be a digital printer, but the printing management apparatus 30 does not recognize which printing apparatus the printing apparatus 50c is. More precisely, there is no need to uniquely identify which printing apparatus the printing apparatus 50c is. Furthermore, the printing apparatus 50c is a printing apparatus that is not connected to the printing management apparatus 30 through the communication line. Therefore, the printing apparatus 50c cannot be connected with the IP address or the like that is retained in the printing management apparatus 30, without notifying the printing management apparatus 30 of the progress in processing over the communication line.

In the present exemplary embodiment, the printing apparatus 50a is provided as an example of the processing entity that notifies the display generation apparatus (the computer) of the progress in processing over the communication line, and an example of the processing entity that makes a connection using the connection information which is retained in a display control apparatus (a computer). Printing by the printing apparatus 50a is used as an example of the first processing that is performed by that processing entity. Furthermore, the printing apparatus 50c is provided as an example of a second processing entity that does not the display generation apparatus (computer) of the progress in processing over the communication line, and as an example of the second processing entity that cannot make a connection using the connection information that is retained in the display control apparatus (the computer), and printing in the printing apparatus 50c is provided as an example of the second processing that is performed by that processing entity. The first processing and the second processing here may be processing operations that are performed concurrently. However, the concurrent performing of the processing operations means that the concurrent performing of the processing operations is allowed, and does not mean that the processing operations have to be necessarily performed concurrently.

The printing apparatus 50b is a printing apparatus that is managed by the organization, but is not connected to the printing management apparatus 30 through the communication line. Therefore, the printing apparatus 50b cannot be connected with the IP address or the like that is retained in the printing management apparatus 30, without notifying the printing management apparatus 30 of the progress in processing over the communication line. The printing apparatus 50b may also be understood as an example of the processing entity that does not notify the display generation apparatus (computer) of the progress in processing over the communication line and as an example of the printing entity that cannot make a connection using the connection information which is retained in the display control apparatus (computer), but the printing apparatus 50c that is managed any other organization is hereinafter described as an example of that processing entity.

Moreover, in FIG. 1, surrounding of the printing apparatuses 50a and 50b with a dashed line indicates that the printing apparatuses 50a and 50b are managed by the organization and that the printing apparatus 50c is managed by any other organization. Furthermore, the printing apparatuses 50b and 50c are not connected to the printing management apparatus 30 through the communication line, but, for convenience, connections to the painting management apparatus 30 are indicated with broken lines in order to indicate inclusion in the printing management system 1.

Figure 2:
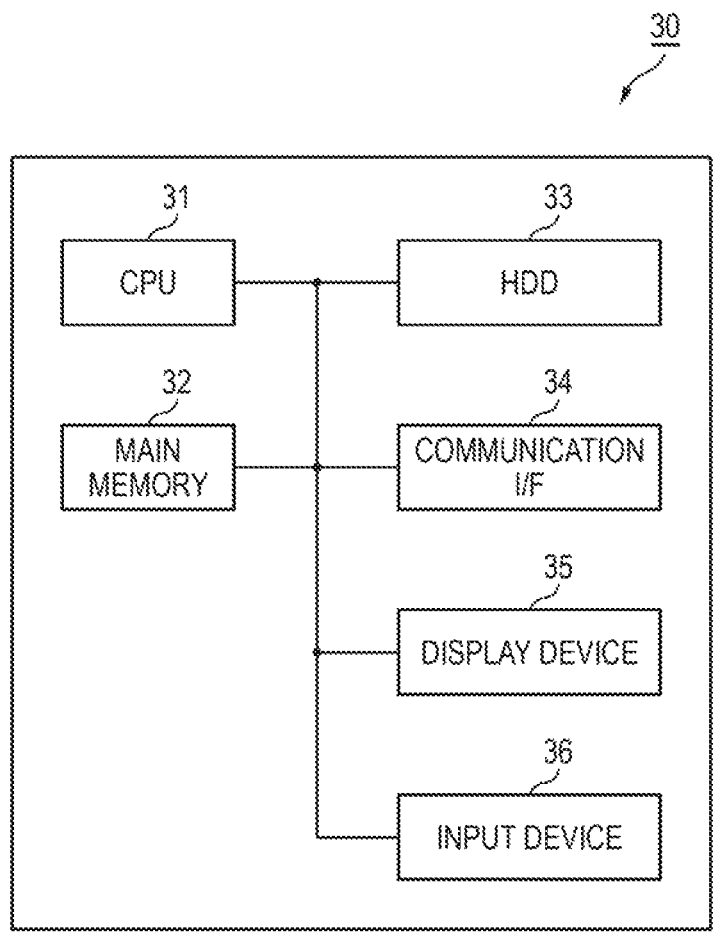
FIG. 2 is a diagram illustrating an example of hardware configuration of a printing management apparatus according to the exemplary embodiment of the present invention.

Hardware Configurations of the Printing Management Apparatus and the Order Acceptance Management Apparatus FIG. 2 is a diagram illustrating an example of a hardware configuration of the printing management apparatus 30 according to the present exemplary embodiment. As illustrated, the printing management apparatus 30 includes a CPU 31 that is an arithmetic operation unit, and a main memory 32 and a hard disk drive (HDD) 33 that are storage units. At this point, the CPU 31 implements various pieces of software, such as an operating system (OS) or an application and realizes each function that will be described below. Furthermore, the main memory 32 is a storage area in which various pieces of software, pieces data that are used for implementing the various pieces of software, and the like are stored, and the HDD 33 is a storage area in which pieces of input data to the various pieces of software, pieces of output data from the various pieces of software, and the like are stored. Moreover, the printing management apparatus 30 includes a communication I/F 34 for performing communication with the outside, a display device 35, such as a display, and an input device 36, such as a keyboard.

Furthermore, a hardware configuration that is illustrated in FIG. 2 is also understood as a hardware configuration of the order acceptance management apparatus 10. However, when the order acceptance management apparatus 10 is described, the CPU 31, the main memory 32, the HDD 33, the communication I/F 34, the display device 35, and the input device 36, which are illustrated in FIG. 2, are assumed to be a CPU 111, a main memory 12, a HDD 13, a communication I/F 14, a display device 15, and an input device 16, respectively.

Hardware Configuration of the Printing Apparatus

Figure 3:
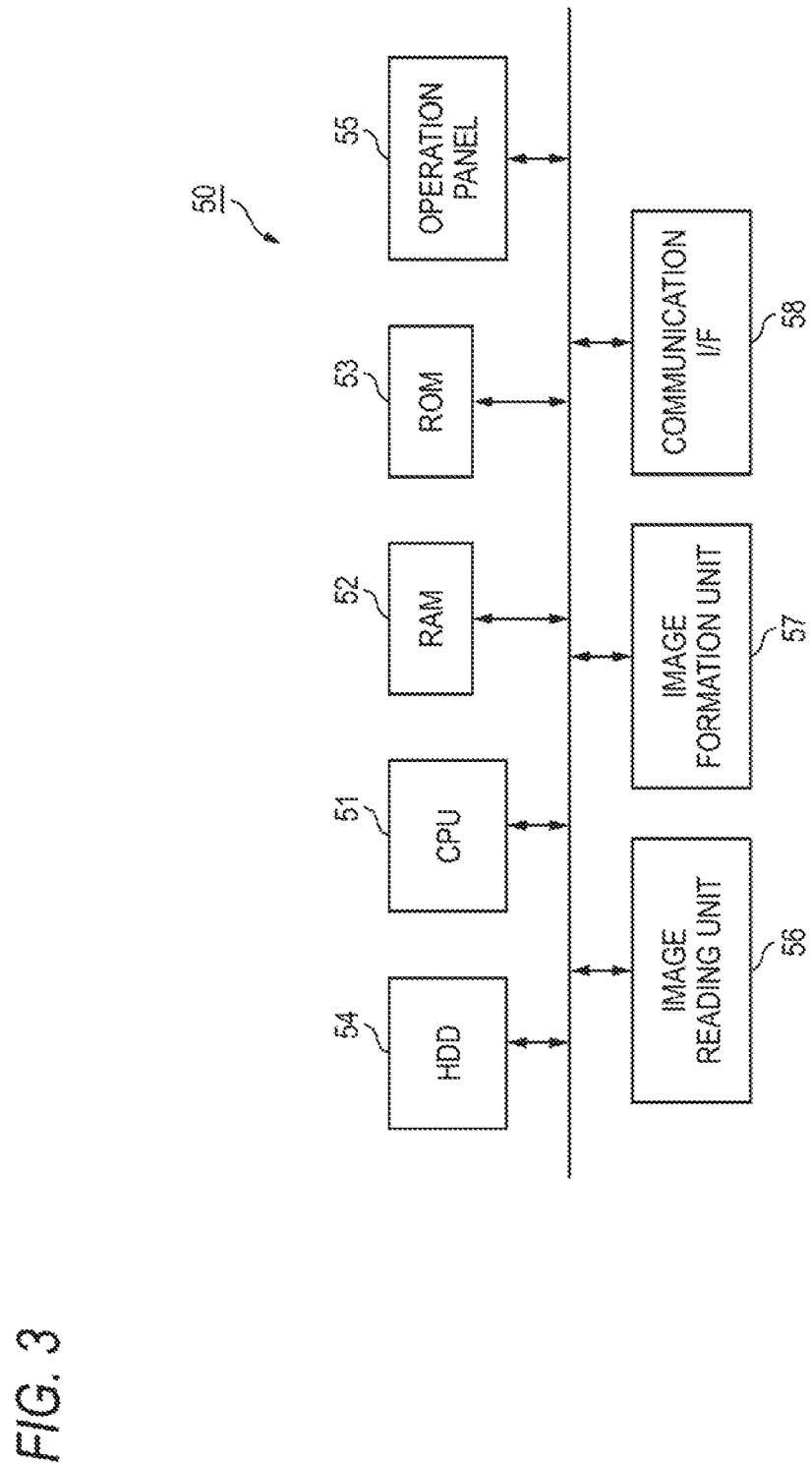
FIG. 3 is a diagram illustrating an example of hardware configuration of a printing apparatus according to the exemplary embodiment of the present invention.

FIG. 3 is a diagram illustrating an example of a configuration of the printing apparatus 50 according to the present exemplary embodiment. As illustrated, the printing, apparatus 50 includes a central processing unit (CPU) 51, a random access memory (RAM) 52, a read only memory (ROM) 53, a hard disk drive (HDD) 54, an operation panel 55, au image reading unit 56, an image formation unit 57, and a communication interface (hereinafter expressed as "communication I/F") 58.

The CPU 51 loads various programs stored in the ROM 53 or the like onto the RAM 52 for execution, and thus realizes each function that will be described below.

The RAM 52 is a memory that is used as a working memory or the like for the CPU 51. The ROM 53 is a memory in Which various programs or the like that are executed by the CPU 51 are stored. The HDD 54, for example, is a magnetic disk device in which image data that is read by the image reading unit 56 or image data that is used for image formation in the image formation unit 57 is stored.

The operation panel 55, for example, is a touch panel on which various pieces of information are displayed and which receives operation input from the user. At this point, the operation panel 55 is made up of a device on which various pieces of information, and a position detection sheet that detects a position indicated by an indication unit, such as a finger or a stylus pen. Alternatively, a display and a keyboard ma be used instead of the touch panel.

The image reading unit 56 reads an image recorded on the recording medium, such as a paper sheet. At this point, the image reading unit 56, for example, is a scanner, and may use a CCD method in which a reflection light that results from a light from a light source being emitted to an original document and reflecting therefrom is collected in a lens and then is received in a Charge Coupled Devices (CCD), or a Contact Image Sensor (CIS) method in which a reflection light that results from a light from an LED light source being successively emitted to an original document and reflecting therefrom is received in a CIS sensor.

The image formation unit 57 forms an image on a recording medium, such as a paper sheet. At this point, the image formation unit 57, for example, is a printer, and may use an electrographic method in which toner that is attached on a photosensitive body is transferred to the recording medium to form an image, or an ink jet method in which ink is discharged on the recording medium to form an image.

The communication I/F 58, for example, performs transmission and reception of various pieces of information to and from the printing management apparatus 30 over the communication line. However, in the present exemplary embodiment, a case where the communication 58 is not included, or a case where the communication I/F 58 is included, but does not function is also assumed.

Functional Configuration of the Printing Management Apparatus

Figure 4:
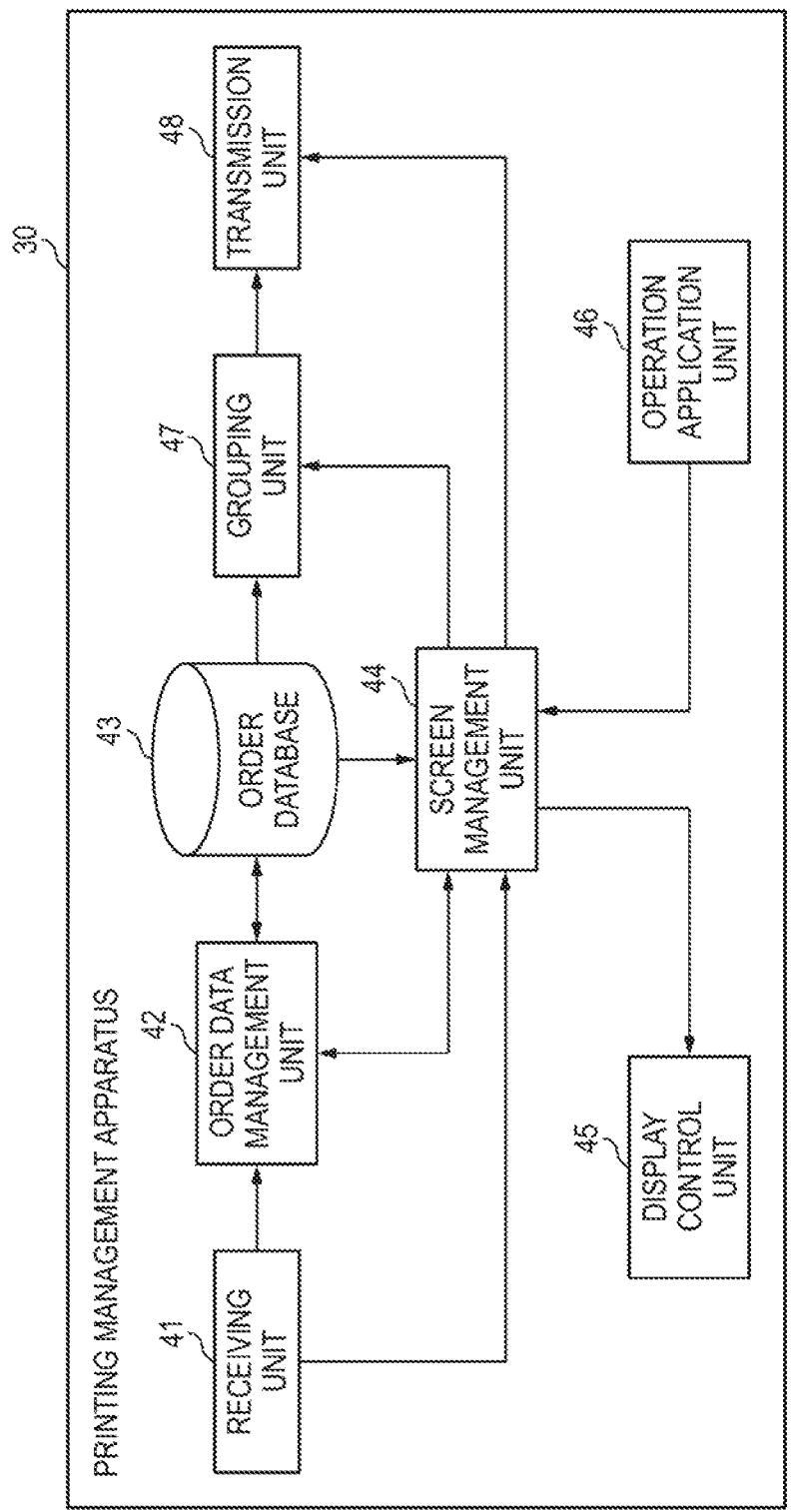
FIG. 4 is a block diagram illustrating an example of a functional configuration of the printing management apparatus according to the exemplary embodiment of the present invention.

FIG. 4 is a block diagram illustrating an example of a functional configuration of the printing management apparatus 30 according to the present exemplary embodiment. As illustrated, the printing management apparatus 30 according to the present exemplary embodiment includes a receiving unit 41, an order data management unit 42, an order database 43, a screen management unit 44, a display control unit 45, an operation application unit 46, a grouping unit 47, and a transmission unit 48.

The receiving unit 41 receives the written instruction data from the order acceptance management apparatus 10. The written instruction data, as described above, includes the order acceptance description, the product description, and the component description. Particularly, the component description includes a description for instructing the printing apparatus 50a to create a component using printing, and a description for instructing the printing apparatus 50c to create a component using printing. In the present exemplary embodiment, the former description is used as an example of information for providing an instruction to perform the first processing, the latter description is used as an example of information for providing an instruction to performs the second processing, and the written instruction data is used as an example of information including the information for providing the instruction to perform the first processing and the information for providing the instruction to perform the second processing. Furthermore, the receiving unit 41 is provided as an example of a receiving unit that receives instruction information.

Furthermore, the receiving unit 41 receives a report that printing is completed (which is hereinafter referred to as "printing completion report"), from the printing apparatus 50a and outputs information that the printing completion report is received (information on reception of a printing completion report), to the order data management unit 42.

The order data management unit 42 acquires the written instruction data from the receiving unit 41 and stores order data in the order database 43. Specifically, the order acceptance description is fetched from the written instruction data and order acceptance data is stored in the order database 43, the product description is fetched from the written instruction data and product data is stored in the order database 43, and the component description is fetched from the written instruction data and component data is stored in the order database 43.

On that occasion, if a supply component flag that is included in the component description is "ON", the order data management unit 42 sets a virtual printer name a printing machine name, in the component data, sets "supply" in supply category, and sets an estimated date and time for reception. On the other hand, if the supply component flag that is included in the component description is "OFF", the printing machine name is set to be an, actual printer name, in the component data, set "manufacture" in the supply category, and does not set an estimated date and time for reception.

The printing machine name is information for identifying the printing apparatus 50 using printing of a component. The virtual printer name is a name of a printing apparatus, which is virtually named to indicate the printing apparatus 50c that prints a component. The virtual printer is an example of a virtual apparatus that is of the same type as the first processing entity. At this point, the virtual apparatus is neither an apparatus that notifies the display generation apparatus of the progress in processing over the communication line, nor an apparatus that makes a connection using the connection information which is retained in the display generation apparatus, but refers to an apparatus that, as if it is an apparatus that is present, may generate not only information for display of progress in the first processing entity, but also at least information for display of progress, in the display generation apparatus. Furthermore, "apparatus that is the same as the first processing entity" here is an apparatus to which contents under an item indicating progress, in the first progress information are applicable as are. In the present exemplary embodiment, under the item indicating progress, "waiting for 'printing'", "'printing' is completed" or the like is shown, and because of this, specifically, "apparatus that is the same as the first processing entity" here is a "printing" apparatus, this is, a printer, to which progress, such as "waiting for 'printing'", or "'printing' is completed" may be applied as is. The actual file name is identification information for uniquely identifying the printing apparatus 50a that actually prints a component.

The supply catalog is information indicating whether or not a component an order for which is received is the manufacture component or the supply component. "Manufacture" that is the supply categorization indicates that the component is the manufacture component and "supply" that is the supply categorization indicates that the component is the supply component.

The estimated date and time for reception is an estimated date and time when a component will be supplied in a case where the component an order for which is received is the supply component.

In the present exemplary embodiment, the supply component flag is used as an example of accompanying information that accompanies the instruction information, the printing machine name is used as an example of an item indicating the processing entity that performs the second processing, setting the printing machine name, as the virtual printer name if the supplied component flag is "ON" is used as an example where the item that indicates the processing entity that performs the second processing is set for a virtual apparatus based on the accompanying information.

Furthermore, in a case where information that a component that results from grouping by the user is designated and where a printing instruction button is pushed down (information relating to pushing-down of the printing instruction button) is acquired from the screen management unit 44, if the printing machine name is set as the actual printer name in the component data on the designated component, the order data management unit 42 instructs the transmission unit 48 to transmits a printing instruction relating to that component to the printing apparatus 50a. On the other hand, if the virtual printer is set as the printing machine name is set to be the virtual printer in the component data on the designated component, a file that is printed in the printing apparatus 50c, which relates to that component is output to the outside. Then, a component status in the component data on the designated component is changed to "printing in progress". Moreover, in the present exemplary embodiment, in a case where the printing machine name is set to be the virtual printer name, the component status is described as being changed to "printing in progress" after the file that is printed in the printing apparatus 50c is output to the outside, but the component status may be changed to "printing in progress" at a point in time when the organization makes a request to any other organization for printing in the printing apparatus 50c.

Moreover, in a case where the information on the reception of the printing completion report in which a component the printing of which is completed in the printing apparatus 50a is designated is acquired from the receiving unit 41, or in a case where information that the component the printing of which is completed in the printing apparatus 50c is designated and that the user pushes down a printing completion report button (information on the pushing-down of the printing completion report button) is acquired from the screen management unit 44, the order data management unit 42 changes the component status in the component data on the designated component to "printing completed". Moreover, in the present exemplary embodiment, the component status is described as being changed to "printing completed" by the receiving unit 41 receiving the printing completion report in a case where the printing apparatus 50a completes printing, but the component status may be changed to "printing completed" by the user checking a result of the printing in the printing apparatus 50a and causing an operation of pushing down the printing completion report button to apply to the operation application unit 46.

The order database 43 is a database in which the order data is stored. Specifically, the order acceptance data, the product data, and the component data are stored.

The screen management unit 44 manages the order management screen that manages the order data stored in the order database 43. Specifically, the order management screen is generated that includes information indicating the progress in processing which, is based on the order acceptance data (which is hereinafter referred to as "order acceptance progress information"), information indicating the progress in processing that is based on the product data (which is hereinafter referred to as "product progress information"), and information indicating the progress in processing that is based on the component data (which is hereinafter referred to as component progress information). On that occasion, included in the component progress information are information indicating progress in creation of the manufacture component using the printing in the printing apparatus 50a (which is hereinafter referred to as "manufacture component progress information"), and information indicating progress in creation of the supply component using the printing in the printing apparatus 50c (which is hereinafter referred to as "supply component progress information").

In the present exemplary embodiment, the manufacture component progress information is used as an example of the first progress information indicating the progress in the first processing, and the supply component progress information is used as an example of the second progress information indicating the progress in the second processing. At this point, the first progress information indicating the progress in the first processing refers to one that results from expressing an identifier (for example, a component number or a component name) for identifying the first processing and the progress (for example, a component status) in the first processing in a manner that is associated with each other, and may include information (for example, an item such as the number of pages or the number of copies) other than the progress. The second processing indicating the progress in the second processing refers to one that results from expressing an identifier (for example, a component number or a component name) for identifying the second processing and the progress (for example, the component status) in the second processing in a manner that is associated with each other, and may include information (for example, an item such as the number of pages or the number of copies) other than the progress. Furthermore, the screen management unit 44 is provided as an example of a generation unit that generates the first progress information and the second progress information in such a manner that the second progress information and the first progress information are displayed on the same display.

Furthermore, in a case where the creation of the manufacture component using the printing in the printing apparatus 50*a* and the creation of the supply component using the printing in the printing apparatus 50*c* are performed concurrently and where the written instruction data includes component descriptions of multiple manufacture components, the screen management unit 44 may generate the order management screen on which the supply component progress information is aligned in a direction that is the same as a direction in which multiple pieces of manufacture component progress information are arranged. For example, the order management screen may be generated on which pieces of manufacture component progress information relating to "book cover", "main body", and the like are arranged in a line in the vertical direction, and on which the supply component progress information relating to "cover" is arranged in a lower row than pieces of manufacture component progress information. In the present exemplary embodiment, the screen management unit 44 is provided as an example of the generation unit that generates multiple pieces of first progress information and the second progress information in such a manner that the second progress information is displayed alongside of multiple pieces of first progress information in a direction in which the multiple pieces of first progress information are arranged, in a case where the instruction information includes multiple pieces of information for providing an instruction to perform the first processing.

Furthermore, the screen management unit 44 may generate the order management screen on which the manufacture component progress information and the supply component progress information are arranged in a line adjacent to each other. In the present exemplary embodiment, the screen management unit 44 is provided as an example of the generation unit that generates the first progress information and the second progress information are displayed adjacent to each other.

Furthermore, the screen management unit 44 may generate the order management screen that includes the product progress information indicating progress in post-processing that is performed after the printing in the printing apparatus 50*a* and the printing in the printing apparatus 50*c* are completed. In such a case, the manufacture component progress information and the supply component progress information may be arranged in a line in same hierarchical layer and may be arranged in a line in a hierarchical layer that is separate from that in which the product progress information is present. In the present exemplary embodiment, post-processing is used as an example of third processing that is performed after the first processing and the second processing are performed completely, and information on the progress in the post-processing is used as an example of third progress information indicating progress in the third processing. Furthermore, the screen management unit 44 is provided as an example of the generation unit that generates the first progress information and the second progress information in such a manner as to be displayed on the same hierarchical layer that is a hierarchical layer which is separate from that on which the third progress information is displayed.

Furthermore, the screen management unit 44 displays the manufacture component progress information and the supply component progress information on the order management screen in a manner that is distinguishable. For example, in some case, a display mode is changed with the manufacture component progress information and the supply component progress information a specific item indicating the presence of the supply component progress information, or a display element other than the item is added to the supply component progress information, not to the manufacture component progress information. Among these, specific examples of chattering the display mode include changing a character attribute (color, font, size, the presence or absence of underline, or the like) with the manufacture component progress information and the supply component progress information. Furthermore, specific examples of displaying a specific item include providing the item "supply category" and thus providing specification as "supply component" or "manufacture component". Furthermore, specific examples of adding a display element other than the item include surrounding only the supply component progress information with a red frame, and adding a flag only to the supply component progress information or providing specification as "supply component". In the present exemplary embodiment, the screen management unit 44 is provided as an example of the generation unit that generates the second progress information in such manner that a specific item indicating the presence of the second progress information is displayed.

Furthermore, when user's operation of pushing down the printing instruction button applies to the operation application unit 46, the screen management unit 44 specifies a position in which the operation is performed, on the order management screen, and outputs the information on the pushing down of the printing instruction button, which includes a component ID of a component of which the printing is requested, to the order data management unit 42. Furthermore, when the user's operation of pushing down the printing completion report button applied to the operation application unit 46, the position in which the operation is performed is specified on the order management screen, and the information on the pushing-down of the printing completion report button, which includes the component ID of the component of which the printing is completed is output to the order data management unit 42.

The display control unit 45 is controlled in such a manner that the order management screen generated by the screen management unit 44 is displayed on the display device 35 (refer to FIG. 2). Particularly, the screen management unit 44 generates the order management screen in such a manner that the order acceptance progress information is included in the first hierarchical layer, that the product progress information is included in the second hierarchical layer, and that the component progress information is included in the third hierarchical layer, and thus on the order management screen, the display control unit 45 displays the order acceptance progress information on the first hierarchical layer, display the product progress information on the second hierarchical layer, and displays the component progress information on the third hierarchical layer.

A user operation applies to the operation application unit 46 through the order management screen displayed on the display device 35 (refer to FIG. 2).

The grouping unit 47 performs grouping on a component of which a component status in the component data that is included in the order data stored in the order database 43 is "waiting for printing".

The transmission unit 48 transmits an instruction to print the component that is grouped to the printing apparatus 50*a* in such a manner that the component grouped by the grouping unit 47 is printed in the printing apparatus 50*a*. Furthermore, a file that is printed in the printing apparatus 50*c*, which relates to the grouped component, is output to the outside, in such a manner that the component grouped by the grouping unit 47 is printed in the printing apparatus 50*c*.

Operation of the Printing Management Apparatus

In the printing management apparatus 30, first, the receiving unit 41 receives the written instruction data from the order acceptance management apparatus 10 and outputs the written instruction data to the order data management unit 42.

When this is done, the order data management unit 42 acquires the written instruction data from the receiving unit 41.

Figure 5:
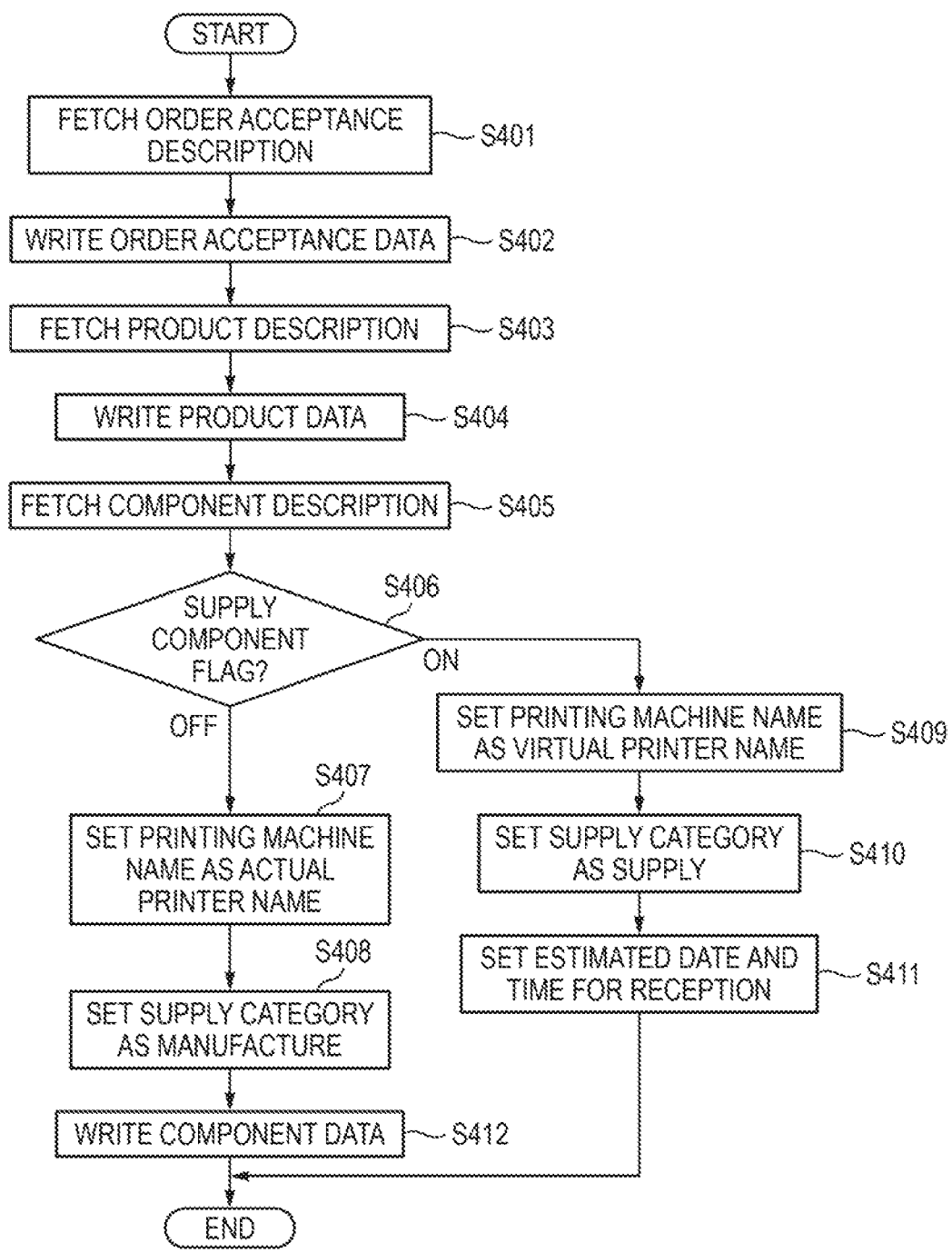
FIG. 5 is a flowchart illustrating an example of operation of an order data management unit, which is to be performed after acquiring written instruction data according to the exemplary embodiment of the present invention.

FIG. 5 is a flowchart illustrating an example of subsequent operation of the order data management unit 42. Moreover, in FIG. 5, processing relating to one order acceptance description within the written instruction data is illustrated, but, actually, the processing relating to all order acceptance descriptions within the written instruction data is repeated.

First, the order data management unit 42 fetches the order acceptance description from the written instruction data (Step 401). Then, the order acceptance data generated based on the order acceptance description is written into the order database 43 (Step 402).

Next, the order data management unit 42 fetches the product description associated with the order acceptance description fetched in Step 401, from the written instruction data (Step 403). For example, regarding the written instruction data, in a case where the order acceptance description is included in the first hierarchical layer, where the product description is included in the second hierarchical layer, and where the component description is included in the third hierarchical layer, the product description that is in a lower hierarchical layer by one layer than the order acceptance description fetched in Step 401 may be fetched as the product description associated with the order acceptance description. Furthermore, if multiple product descriptions are present, these may be all fetched. Then, the product data generated based on the product description is written into the order database 43 (Step 404).

Subsequently, the order data management unit 42 fetches the component description associated with the product description fetched in Step 403, from the written instruction data (Step 405). For example, regarding the written instruction data, in the case where the order acceptance description is included in the first hierarchical layer, where the product description is included in the second hierarchical layer, and where the component description is included in the third hierarchical layer, the component description that is in a lower hierarchical layer by one layer than the product description fetched in Step 403 may be fetched as the component description associated with the product description. Furthermore, if multiple component descriptions are present, these may be all fetched.

Accordingly, the order data management unit 42 determines a value of the supply component flag, which is included in the component description (Step 406). If it is determined that the supply component flag is "OFF", in the component data generated based on the component description, the order data management unit 42 sets the printing machine name as the actual printer name (Step 407), sets the supply category as "manufacture" (Step 408), and does not set an estimated date and time for reception. In the case where it is determined that the supply component flag is "ON", in the component data generated based on the component description, the order data management unit 42 sets the virtual printer name as the printing machine name (Step 409), sets "supply" in the supply category (Step 410), and sets the estimated date and time for reception (Step 411).

Thereafter, the order data management unit 42 writes the component data in which the printing machine name is set as the actual printer name, and in which the supply category is set as "manufacture", or the component data in which the printing machine name is set to be the virtual printer name, in which the supply category is set to be "supply", and in which the estimated date and time for reception is set, into the order database 43 (Step 412).

Next, various pieces of data that are written, by the operation that is illustrated in FIG. 5, into the order database 43 be described.

FIG. 6 is a diagram illustrating an example of the order acceptance data that is written into the order database 43. As illustrated, the order acceptance data is one that results from associating an order acceptance ID, a date and time for order acceptance, an order acceptance status, an estimated date and time for shipping, and so on with each other.

At this point, the order acceptance ID is identification information for uniquely identifying order acceptance. The date and time for order acceptance is a date and time when an order was received.

The order acceptance status is a current state of order acceptance. If any one of the product statuses in the product data associated with the order acceptance data is set as "waiting for a job", the order acceptance status is set as "waiting for a job", and if all product statuses in the product data associated with the order acceptance data are set as "job completed", the order acceptance statue is set as "job completed". Therefore, in FIG. 5, the order acceptance status is not set in Step 402, and thereafter, the order acceptance status may be set as "waiting for a job" at a point in time when any one of the product statuses in the product data associated with the order acceptance data is set as "waiting for a job", and the order acceptance status may be set as "job completed", at a point in time when all product statuses in the product data associated with the order acceptance data are set as "job completed".

The estimated date and time for shipping is an estimated date and time when a product an order for which is received will be shipped.

FIG. 7 is a diagram illustrating an example of the product data that is written into the order database 43. As illustrated, the product data is one that results from associating a product ID, a product name, the number of copies, a product status, an estimated date and time when post-processing will start, and so on with each other.

The product ID here is identification information for uniquely identifying a product an order for which is received. The product ID is set to be one that results from combining an order acceptance ID of order acceptance that corresponds to the product, and a product branch number, and thus the order acceptance data and the product data are associated with each other. However, an item indicating a link to the product data and an item indicating a link to the order acceptance data are provided in the order acceptance data and the product data, respectively, and thus the order acceptance data and the product data may be associated with each other.

The product name is a name of a product an order for which is received. The number of copies is the number of copies of a product an order for which is received.

The product status is a current state of the product an order for which is received. If any one of the component statuses in the component data associated with the product data is set as "waiting for printing", the product status is set as "waiting for a job", and if all component statuses in the component data associated with the product data are set as "printing completed", the product status is set as "job completed". Therefore, in FIG. 5, the product status is not set in Step 404, and thereafter, the product status may be set as "waiting for a job" at a point in time when any one of the component statuses in the component data associated with the product data is set as "waiting for printing", and the product status may be set as "job completed" at a point in time when all component statuses in the component data associated with the product data are set as "printing completed".

The estimated date and time when post-processing will start is an estimated date and time when post-processing will start for completing a product an order for which is received.

FIG. 8 is a diagram illustrating an example of the component data that is written into the order database 43. As illustrated, the component data is one that results from associating a component ID, a component name, the number of pages, the number of copies, the component status, an estimated date and time when printing will start, the printing machine name, the supply category, the estimated date and time for reception, and so on with each other.

The component ID here is identification information for uniquely identifying a component (a component an order for which is received) of a product an order for which is received. The component ID is set to be one that results from combining a product ID of a product corresponding to the component and a product branch number, and thus the product data and the component data are associated with each other. However, an item indicating a link to the component data and an item indicating a link to the product data are provided in the product data and the component data, respectively, and thus the product data and the component data may be associated with each other.

The component name is a name of a component and order for which is received. The number of pages is the number of pages of a component an order for which is received. The number of copies is the number of copies of a component an order for which is received.

The component status is a current state of a component an order for which is received. Component statues of components with component IDs "10000-1-1", "10000-1-3", and "10000-1-10" are set as "waiting for printing".

The estimated date and time when printing will start is an estimated date and time when a component an order for which is received will start to be printed.

The printing machine name is information for identifying the printing apparatus 50 that is used for printing a component an order for which is received. Printing machine names for the components with the components IDs "10000-1-1" and "10000-1-3" may be set as the actual printer name. Specifically, the printing machine name for the component with the component ID "10000-1-1" is set as a printer name "B-5" of one printing apparatus of the printing apparatuses 50*b*, and the printing machine name for the component with the component ID "10000-1-3" is set as a printer name "A-1" of one printing apparatus of the printing apparatuses 50*a*. Furthermore, the printing machine name for the component with the component ID "10000-1-10" is set to be the virtual printer name. At this point, a string of characters, such as a "printing apparatus in any other department" is used as the virtual printer name, but virtual printer names that are not employed as the printer names of the printing apparatus 500 and the printing apparatus 50*b*, which are suitable for printer names may be used.

The supply category is information indicating whether or not a component an order for which is received is the manufacture component or the supply component. Because the components with the component IDs "10000-1-1", and "10000-1-3" are assumed to be printed in the printing apparatuses 50*a* and 50*b* that are managed by the organization, the supply category is set as "manufacture". Because the component with the component ID "10000-1-10" is assumed to be printed in the printing apparatus 50*c* that is managed by any other organization, the supply category is set as "supply".

The estimated date and time for reception is an estimated date and time when a component will be printed in the printing apparatus 50*c* and be supplied in a case were the component an order for which is received is the supply component. The time and date for reception is set only for the component with the component ID "10000-1-10", of which the supply category is "supply".

When in this manner, the order data is written into the order database 43, the screen management unit 44 generates the order management screen in which the order data is reflected.

Figure 9:
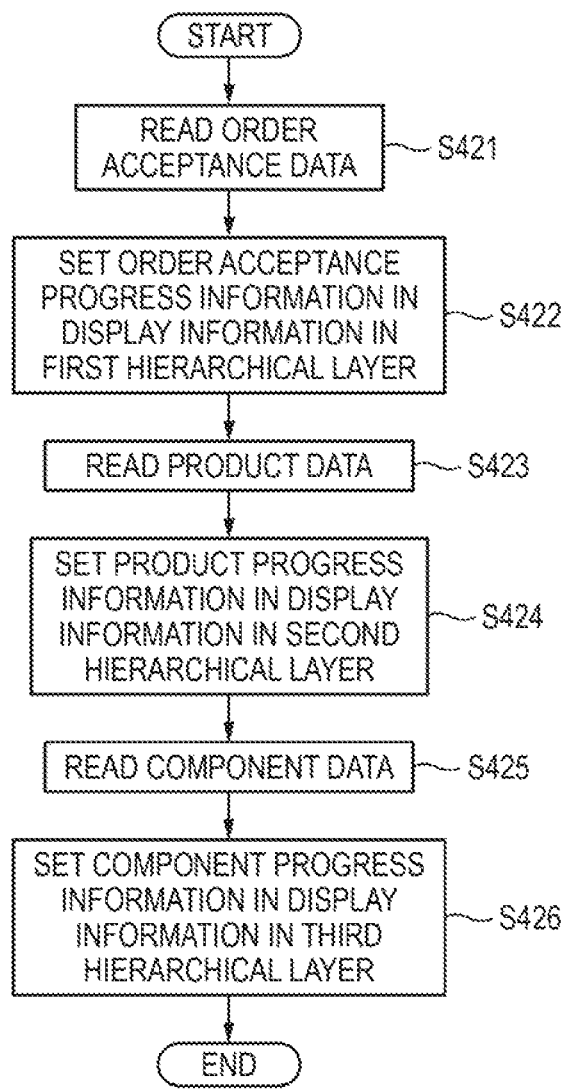
FIG. 9 is a flowchart illustrating an example of operation of a screen management unit, which is to be performed when an order management screen according to the exemplary embodiment of the present invention is generated.

FIG. 9 is a flowchart illustrating an example of operation of the screen management unit 44, which is to be performed at that time. Moreover, in FIG. 9, processing relating to one piece of order acceptance data within the order database 43 is illustrated, but, actually, this processing is performed repeatedly on all pieces of order acceptance data within the order database 43.

First, the screen management unit 44 reads the order acceptance data from the order database 43 (Step 421). Then, the order acceptance progress information generated based on the order acceptance data is set to be in the display information in the first hierarchical layer on the order management screen (Step 422).

Next, the screen management unit 44 reads the product data that is associated with the order acceptance data which is read in Step 421, from the order database 43 (Step 423). For example, the product data with the product ID that results from combining the order acceptance ID of the order acceptance data that is read in Step 421 and the product branch number may be read as the product data that is associated with the order acceptance data. Then, the product progress information generated based on the product data is set to be in the display information in the second hierarchical layer on the order management screen (Step 424).

Subsequently, the screen management unit 44 reads the component data associated with the product data that is read in Step 423, from the order database 43 (Step 425). For example, the component data with the component ID that results from combining the product ID of the product data that is read in Step 423 and the component branch number may be read as the component data associated with the product data. Then, the component progress information generated based on the component data is set to be in the display information in the third hierarchical layer on the order management screen (Step 426).

When, in this manner, the screen management unit 44 generates the order management screen, the display control unit 45 performs control in such a manner that the order management screen is displayed on the display device 35 (refer to FIG. 2).

FIG. 10 is a diagram illustrating an example of the order management screen that is displayed in this manner. As illustrated, on the order management screen, order acceptance progress information 310 relating to order acceptance of an order acceptance ID "10000", product progress information 320 relating to a product with a product ID "10000-1" that is included in the order, and component progress information 330 relating to components with component IDs "10000-1-1", "10000-1-3" and "10000-1-10" that are included in the product are shown in an order data display field 301. At this point, the order management screen is generated in such a manner that the order acceptance progress information is included in the first hierarchical layer, that the product progress information is included in the second hierarchical layer, and that the component progress information is included in the third hierarchical layer, and because of this, on the displayed order management screen, order acceptance progress information 310, product progress information 320, and component progress information 330 are also displayed on the first hierarchical layer, the second hierarchical layer, and the third hierarchical layer, respectively. Furthermore, it is shown that the component statuses of the components with the component IDs "10000-1-1", "10000-1-3", and "10000-1-10" are "waiting for printing".

Furthermore, on the order management, a manufacture component progress information 331 and a supply component progress information 332 are displayed in a manner that is included in the component progress information 330. That is, for display, the supply component is also handled in the same manner as any other component. However, in the supply component progress information 332, the presence of a supply component may be expressly indicated in such a manner that it is understood that this is information on the supply component. For example, it is also considered that a row for the supply component is displayed in different color than a row for the manufacture component, or that a specific item indicating the presence of the supply component progress information is provided.

At this point, examples of the specific item include an item that, like "supply category" described above, indicates, whether the supply component or the manufacture component is present. Furthermore, an item that indicates contents that are different in attribute from each other in the first progress information and the second progress information while using the same item name is given, and a "printing machine name" in FIG. 10 is an example of this item. Furthermore, as a specific item, an item that indicates contents in the second progress information without indicating contents in the first progress information is given. It may also be understood that this is an item that has no meaning in terms of the first progress information and has a meaning in terms of the second progress information. "Date and time for reception" is an example of this item. Moreover, as a specific item, an item that has no meaning in terms of the first progress information and has no meaning in terms of the second progress information is also given. "Estimated date and time when printing will start" is an example of this item. For example, when it is checked whether or not there is a delay from the estimated date and time when printing will be completed, for the supply component, "estimated date and time for reception" is used as the estimated date and time when printing will be completed, and for the manufacture component, a date and time that result from adding the numbers of days to "estimated date and time when printing will start" is used as the estimated date and time when printing will be completed. Because of this, it may be said that "estimated date and time for reception" is information that has a meaning only in terms of the second progress information, and that "estimated date and time when printing will start" is information that has a meaning only in terms of the first progress information. Moreover, the expression "without indicating contents in the first progress information" may be assumed to mean that the item itself is not displayed, but, in the present exemplary embodiment, is assumed to mean that the item itself is displayed and that its contents are not present.

Furthermore, a row for the supply component progress information 332 changes in color in a case where the estimated date and time for reception of a supply component nears. More precisely, the second progress information has a function of changing a display mode at a certain timing and thus alerting the user that the timing nears and on the other hand, the first progress information does not have that function. In this manner, the manufacture component progress information 331 and the supply component progress information 332 may be distinguished by the function.

It is assumed that, in this state, for example, the user selects any one of the components from a separate screen and thus performs grouping, and designates the grouped component and thus performs the operation of pushing down, printing instruction button. When this is done, the grouped component is designated and thus the operation of pushing down the printing instruction button applies to the operation application unit 46. Accordingly, the screen management unit 44 outputs a component ID of the designated component and information that the printing instruction button is pus red down (the information on the pushing-down of the printing instruction button) to the order data management unit 42.

Figure 11:
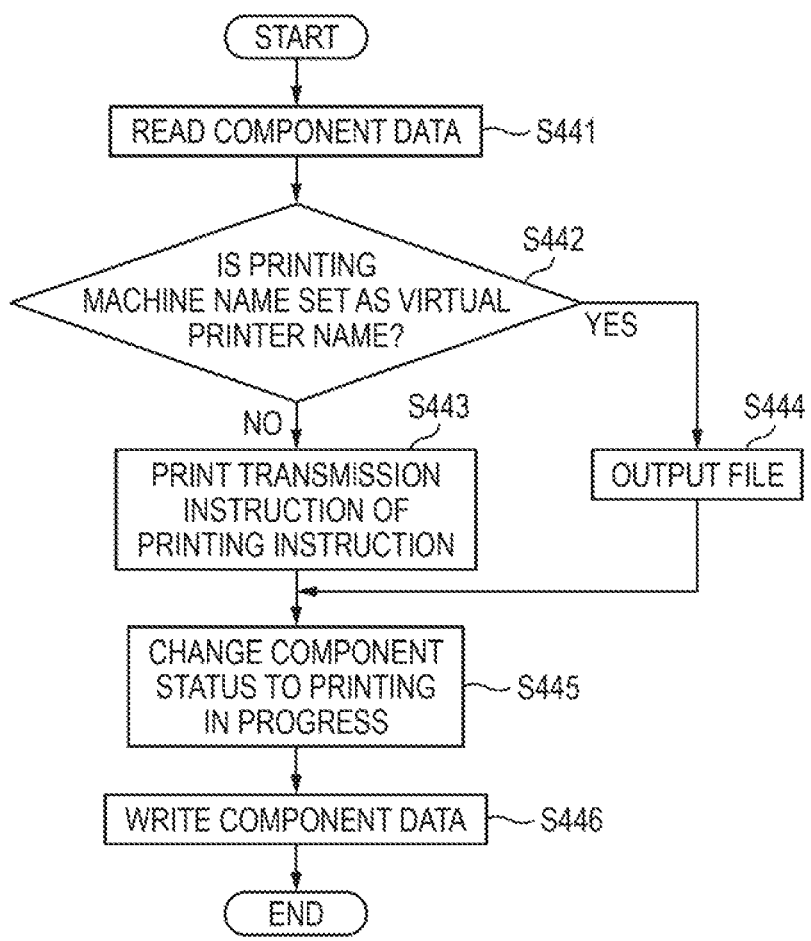
FIG. 11 is a flowchart illustrating an example of operation of the order data management unit, which is to be performed after a printing instruction button according to the exemplary embodiment of the present invention is pushed down.

FIG. 11 is a flowchart illustrating an example of subsequent operation of the order data management unit 42. Moreover, in FIG. 11, processing relating to one component ID is illustrated, but, actually, this processing is repeated with each of all component IDs passed on from the screen management unit 44 as the designated component ID. Furthermore, it is presumed here that the assumption that printing is performed in the printing apparatus 50*b* as is the case with the component with the component ID "10000-1-1" that is illustrated in FIGS. 8 and 10 is not considered.

First, the order data management unit 42 reads a component data with the designated component ID from the order database 43 (Step 441).

Next, the order data management unit 42 determines whether or not the printing machine name in the component data read in Step 441 is the virtual printer name (Step 442).

As a result, if it is determined that the printing machine name set is not the virtual printer name, more precisely, is the actual printer name, the order data management unit 42 outputs an instruction to transmit a printing instruction to print a component corresponding to the component data in the printing apparatus 50*a*, to the transmission unit 48 (Step 443). Accordingly, the transmission unit 48 transmits a printing instruction for providing an instruction to print the component corresponds to the component data, to the printing apparatus 50a.

On the other hand, if it is determined that the printing machine name set is the virtual printer name, the order data management unit 42 outputs a file, which is printed in the printing apparatus 50c, to the outside, in such a manner that the component corresponds to the component data is printed in the printing apparatus 50c (Step 444).

Subsequently, the order data management unit 42 changes the component status in the component data from "waiting for printing" to "printing in progress" (Step 445).

Thereafter, the order data management unit 42 writes the component data, the component status in which is changed in this manner to "printing in progress", into the order database 43 (Step 446).

Next, various pieces of data that are written, by the operation that is illustrated in FIG. 11, into the order database 43 will be described. The order acceptance data that is written into the order database 43 is the same as that which is illustrated in FIG. 6, and thus a description thereof is omitted. The product data that is written into the order database 43 is the same as that which is illustrated in FIG. 7, and thus a description thereof is omitted.

FIG. 12 is a diagram illustrating an example of the component data that is written into the order database 43. As illustrated, the component data is one that results from associating the component ID, the component name, the number of pages, the number of copies, the component status, the estimated date and time when printing will start, the printing machine name, the supply category, the estimated date and time for reception, and so on with each other. These items are the same as those which is illustrated in FIG. 8, but the statuses of the components with the component IDs "10000-1-1", "10000-1-3", and "10000-1-10" are set as "printing in progress".

When in this manner, the order data is written into the order database 43, the screen management unit 44 generates the order management screen in which the order data is reflected. The order management screen is the same as that which is illustrated in FIG. 10, except that "printing in progress" is displayed, as the component statuses of the components with the component IDs "10000-1-1", "10000-1-3", and "10000-1-10", on the order management screen, and thus a description thereof is omitted.

Thereafter, it is assumed that the printing in the printing apparatus 50a and the printing in the printing apparatus 50c are completed.

When this is done, the printing apparatus 50a transmits the printing completion report to the printing management apparatus 30 over the communication line 85a. Accordingly, in the printing management apparatus 30, the receiving unit 41 receives the printing completion report from the printing apparatus 50a. Then, the component ID of the component of which the printing is completed, and the information that the printing completion report is received (the information on the reception of the printing completion report) are output to the order data management unit 42. Moreover, because the printing management apparatus 30 manages information on correspondence between the printing apparatus 50 and a component ID of a component of which printing in the printing apparatus 50 is requested, the receiving unit 41 may specify the component ID of the component of which the printing is completed, based on the information on the correspondence.

On the other hand, the printing apparatus 50c cannot transmit the printing completion report to the printing management apparatus 30 over the communication line. Thus, any other organization notifies the organization that the printing in the printing apparatus 50c is completed, the user in the organization, for example, designates the component of which the printing is completed, from a separate screen, and performs the operation of pushing down the printing completion report button. When this is done, the component of which the printing is completed is designated, and the operation of pushing down the printing completion report button applies to the operation application unit 46. Accordingly, the screen management unit 44 outputs the component ID of the designated component and information that the printing completion report button is pushed down (the information on the pushing-down of the printing completion report button) to the order data management unit 42.

Figure 13:
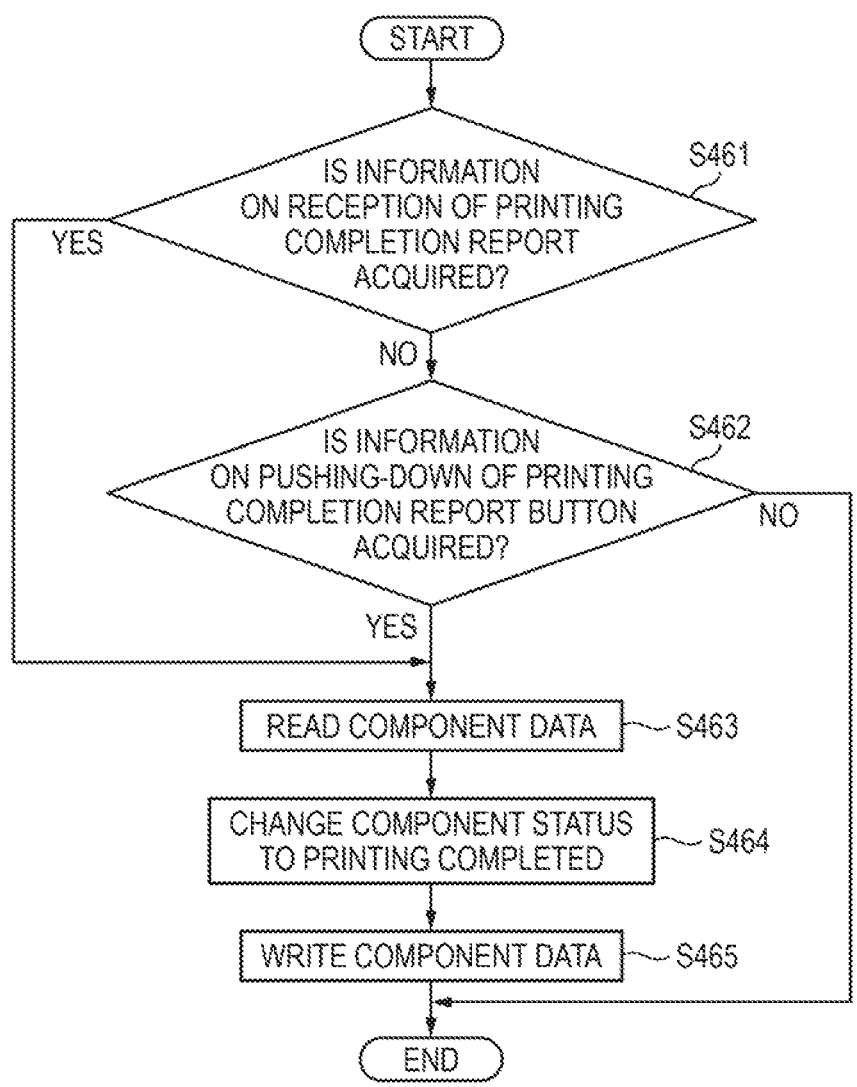
FIG. 13 is a flowchart illustrating an example of operation of the order data management unit, which is to be performed after a printing completion report according to the exemplary embodiment of the present invention is received, or after a printing completion report button is pushed down.

FIG. 13 is a flowchart illustrating an example of subsequent operation of the order data management unit 42. Moreover, in FIG. 13, the processing relating to one component ID is illustrated, but, actually, this processing is repeated with each of all component IDs passed on from the receiving unit 41 or the screen management unit 44 as the designated component ID. Furthermore, it is presumed here that the assumption that printing is performed in the printing apparatus 50b as is the case with the component with the component ID "10000-1-1" that is illustrated in FIGS. 8 and 10 is not considered.

First, the order data management unit 42 determines whether or not the information on the reception of the printing completion report is acquired from the receiving unit 41 (Step 461).

As a result, if it is determined that the information on the reception of the printing completion report is acquired from the receiving unit 41, the order data management unit 42 causes the processing to proceed to Step 463.

On the other hand, if it is determined that the information on the reception of the printing completion report is received from the receiving unit 41, the order data management unit 42 determined whether or not the information on the pushing-down of the printing completion report button is acquired from the screen management unit 44 (Step 462). Then, if it is determined that the information on the pushing-down of the printing completion report button is acquired from the screen management unit 44, the order data management unit 42 causes the processing to proceed to Step 463.

Accordingly, the order data management unit 42 reads the component data with the designated component ID from the order database 43 (Step 463).

Next, the order data management unit 42 changes the component status in the component data from printing in progress" to "printing completed" (Step 464).

Thereafter, the order data management unit 42 writes the component data, the component status in which is changed in this manner to "printing completed", into the order database 43 (Step 465).

Moreover, if it is determined that the information on the pushing-down of the printing completion report is acquired from the screen management unit 44, the order data management unit 42 ends the processing without performing Steps 463 to 465.

Next, various pieces of data that are written, by the operation that is illustrated in FIG. 13, into the order database 43 will be described. The order acceptance data that is written into the order database 43 is the same as that which is illustrated in FIG. 6, and thus a description thereof is omitted. The product data that is written into the order database 43 is the same as that which is illustrated in FIG. 7, and thus a description thereof is omitted.

FIG. 14 is a diagram illustrating an example of the component data that is written into the order database 43. As illustrated, the component data is one that results from associating the component ID, the component name, the number of pages, the number of copies, the component status, the estimated date and time when printing will start, the printing machine name, the supply category, the estimated date and time for reception, and so on with each other.

These items are the same as those which is illustrated in FIG. 8, but the statuses of the components with the component IDs "10000-1-1", "10000-1-3", and "10000-1-10" are set as "printing completed".

When in this manner, the order data is written into the order database 43, the screen management unit 44 generates the order management screen in which the order data is reflected.

The order management screen is the same as that which is illustrated in FIG. 10, except that "printing completed" is displayed, as the component statuses of the components with the component IDs "10000-1-1", "10000-1-3", and "10000-1-10", on the order management screen, and thus a description thereof is omitted.

Program

Processing that is performed by the printing management apparatus 30 according to the present exemplary embodiment for example, is prepared by a program such as application software.

That is, a first program realizing the present exemplary embodiment is a program that causes a computer to perform a function of receiving instruction information including information for providing an instruction to perform first processing that is performed by a processing entity which notifies the computer of progress in processing over a communication line, and information for providing an instruction to perform second processing that is performed by the processing entity which does not notify the computer of the progress in the processing over the communication line, and a function of generating first progress information indicating progress in the first processing and second progress information indicating progress in the second processing, based on the instruction information, in such a manner the second progress information is displayed on the same screen as the first progress information.

Furthermore, a second program realizing the present exemplary embodiment is a program that causes a computer to perform a function of receiving instruction information including information for providing an instruction to perform first processing that is performed by a processing entity which makes a connection using connection information that is retained in the computer, and information for providing an instruction to perform second processing that is performed by the processing entity which cannot make a connection using the connection information that is retained in the computer, and a function of generating first progress information indicating progress in the first processing and second progress information indicating progress in the second processing, based on the instruction information, in such a manner the second progress information is displayed on the same screen as the first progress information.

Moreover, the program realizing the present exemplary embodiment, of course, is provided by a communication unit, and is also possibly provided in a state of being stored on a recording medium such as a CD-ROM.

The foregoing description of the embodiments of the present invention has been provided for the purposes of illustration and description. It is not intended to be exhaustive or to limit the invention to, the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display generation apparatus comprising:
at least one processor configured to:
receive instruction information including information for providing an instruction to perform first processing that is performed by a first processing entity which notifies the display generation apparatus of progress in processing over a communication line, and information for providing an instruction to perform second processing that is performed by a second processing entity which does not notify the display generation apparatus of the progress in the processing over the communication line; and
generate first progress information indicating progress of the first processing and second progress information indicating progress of the second processing based on the instruction information, in such a manner that the second progress information is displayed on a same screen on which the first progress information is displayed, wherein the second progress information is acquired based on a user's input.

2. A display generation apparatus comprising:
at least one processor configured to:
receive instruction information including information for providing an instruction to perform first processing that is performed by a first processing entity which makes a connection using connection information retained in the display generation apparatus, and information for providing an instruction to perform second processing that is performed by a second processing entity which does not make a connection using the connection information retained in the display generation apparatus; and
generate first progress information indicating progress of the first processing and second progress information indicating progress of the second processing based on the instruction information, in such a manner that the second progress information is displayed on a same screen on which the first progress information is displayed, wherein the second progress information is acquired based on a user's input.

3. The display generation apparatus according to claim 1,
wherein the first processing and the second processing are processing operations that are performed concurrently, and
wherein, in a case where the instruction information includes a plurality of pieces of information for providing the instruction to perform the first processing, the at least one processor is configured to generate a plurality of pieces of first progress information and the second progress information in such a manner that the second progress information is displayed alongside of the plurality of pieces of first progress information in a direction in which the plurality of pieces of first progress information are arranged.

4. The display generation apparatus according to claim 2, wherein the first processing and the second processing are processing operations that are performed concurrently, and wherein, in a case where the instruction information includes a plurality of pieces of information for providing the instruction to perform the first processing, the at least one processor is configured to generate a plurality of pieces of first progress information and the second progress information in such a manner that the second progress information is displayed alongside of the plurality of pieces of first progress information in a direction in which the plurality of pieces of first progress information are arranged.

5. The display generation apparatus according to claim 3, wherein the at least one processor is configured to generate the first progress information and the second progress information in such a manner that the first progress information and the second progress information are displayed to be adjacent to each other.

6. The display generation apparatus according to claim 4, wherein the at least one processor is configured to generate the first progress information and the second progress information in such a manner that the first progress information and the second progress information are displayed to be adjacent to each other.

7. The display generation apparatus according to claim 1, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

8. The display generation apparatus according to claim 2, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

9. The display generation apparatus according to claim 3, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

10. The display generation apparatus according to claim 4, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

11. The display generation apparatus according to claim 5, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

12. The display generation apparatus according to claim 6, wherein the at least one processor is configured to:

generate third progress information indicating progress of third processing, to be displayed, the third processing being performed after the first processing and the second processing are completed, and generate the first progress information and the second progress information in such a manner that the first progress information and the second progress information are displayed on a same hierarchical layer that is different from a hierarchical layer on which the third progress information is displayed.

13. The display generation apparatus according to claim 1, wherein the at least one processor is configured to generate the second progress information in such a manner that a specific item indicative of the second progress information is displayed.

14. The display generation apparatus according to claim 2, wherein the at least one processor is configured to generate the second progress information in such a manner that a specific item indicative of the second progress information is displayed.

15. The display generation apparatus according to claim 13, wherein the at least one processor uses, as the specific item, an item that is not displayed in association with the first progress information and is displayed in association with the second progress information.

16. The display generation apparatus according to claim 14, wherein the at least one processor uses, as the specific item, an item that is not displayed in association with the first progress information and is displayed in association with the second progress information.

17. The display generation apparatus according to claim 1,
wherein the at least one processor sets, as an item indicative of the second processing entity, a virtual apparatus being of a same type as an apparatus of the first processing entity.

18. The display generation apparatus according to claim 17,
wherein the at least one processor sets the virtual apparatus as the item indicative of the second processing entity based on accompanying information that accompanies the instruction information that is received.

19. A non-transitory computer readable medium storing a program causing a computer to execute a process comprising:
receiving instruction information including information for providing an instruction to perform first processing that is performed by a first processing entity which notifies the computer of progress in processing over a communication line, and information for providing an instruction to perform second processing that is performed by a second processing entity which does not notify the computer of the progress in the processing over the communication line; and
generating first progress information indicating progress of the first processing and second progress information indicating progress of the second processing based on the instruction information, in such a manner that the second progress information is displayed on a same screen on which the first progress information is displayed, wherein the second progress information Ls acquired based on a user's input.

20. A non-transitory computer readable medium storing a program causing a computer to execute a process comprising:
receiving instruction information including information for providing an instruction to perform first processing that is performed by a first processing entity which makes a connection using connection information that is retained in the computer; and information for providing an instruction to perform second processing that is performed by a second processing entity which does not make a connection using the connection information that is retained in the computer; and
generating first progress information indicating progress of the first processing and second progress information indicating progress of the second processing based on the instruction information, in such a manner that the second progress information is displayed on a same screen on which the first progress information is displayed, wherein the second progress information is acquired based on a user's input.

* * * * *